(12) United States Patent
Kelly et al.

(10) Patent No.: US 7,033,639 B2
(45) Date of Patent: Apr. 25, 2006

(54) POLYANILINE COATING COMPOSITION

(75) Inventors: Michael DeWayne Kelly, North Wales, PA (US); Thomas Glenn Madle, Flourtown, PA (US); Paul Ralph Van Rheenen, Warminster, PA (US)

(73) Assignee: Rohm and Haas Company, Marlborough, MA (US)

( * ) Notice: Subject to any disclaimer, the term of this patent is extended or adjusted under 35 U.S.C. 154(b) by 22 days.

(21) Appl. No.: 10/126,820

(22) Filed: Apr. 19, 2002

(65) Prior Publication Data

US 2003/0065090 A1 Apr. 3, 2003

Related U.S. Application Data

(60) Provisional application No. 60/291,385, filed on May 16, 2001.

(51) Int. Cl.
*B32B 27/14* (2006.01)
(52) U.S. Cl. .................. 427/213.34; 428/407; 523/201
(58) Field of Classification Search ................ 523/201; 427/213.34; 428/407
See application file for complete search history.

(56) References Cited

U.S. PATENT DOCUMENTS

| 4,380,590 | A | 4/1983 | Chong ......................... 521/33 |
| 4,499,150 | A | 2/1985 | Dowbenko et al. .......... 428/447 |
| 4,707,515 | A | 11/1987 | Gilch et al. .................. 524/506 |
| 5,069,820 | A | 12/1991 | Jen et al. |
| 5,281,363 | A * | 1/1994 | Shacklette et al. .......... 252/500 |
| 5,371,182 | A | 12/1994 | Galaj et al. |
| 5,376,728 | A | 12/1994 | Patil et al. |
| 6,060,116 | A | 5/2000 | Kulkarni et al. |
| 6,399,675 | B1 * | 6/2002 | Kim et al. ................... 523/206 |

FOREIGN PATENT DOCUMENTS

| EP | 0538939 | 4/1993 |
| JP | 02252733 | 10/1990 |
| WO | WO 9218988 | 10/1992 |

* cited by examiner

*Primary Examiner*—Jeffrey Mullis
(74) *Attorney, Agent, or Firm*—John J. Piskorski

(57) ABSTRACT

A coating composition including a polyaniline particle and a binder is provided. The polyaniline particle contains a core polymer particle with strong acid groups and an attached polyaniline polymer, and has a particle diameter in a select range. Coatings prepared from the coating composition may be employed to provide corrosion resistance to metal substrates. A process for preparing the polyaniline particle and an article including a coating prepared from the coating composition are also provided.

10 Claims, No Drawings

POLYANILINE COATING COMPOSITION

CROSS REFERENCE TO RELATED PATENT APPLICATIONS

This is a non-provisional application of prior pending U.S. provisional application Ser. No. 60/291,385 filed May 16, 2001.

This invention relates to a polyaniline particle. In particular, this invention relates to a polyaniline particle containing a polyaniline polymer attached to a core polymer particle. The polyaniline particle is useful as a component of a coating composition which is suitable for preparing a protective coating for providing corrosion resistance to metal substrates.

Steel is used extensively in structures such as buildings, bridges, pipes, and storage tanks, in ships, and in automobiles and trucks. To protect the steel from corrosion, various methods are employed including electrochemical methods, application of corrosion inhibitors, and the application of barrier coatings. One method is to apply a conductive coating containing metallic pigments such as zinc or semiconducting metal oxides such as chromates at relatively high volume concentrations. However, there is increasing interest in heavy metal-free coatings as such coatings are subjected to increasing governmental regulation.

Conductive coatings which do not contain heavy metals are known in the art. One type of conductive coating suitable for protecting steel is a coating containing a conductive organic polymer such as polyaniline. Japanese Patent Application 2-252733 to Ogawa et al. discloses a method for preparing a conductive polyaniline polymer by a specific chemical oxidation polymerization of aniline in the presence of a solid polymer substrate which contains select acid groups. The acid groups of the polymer substrate act as a dopant for the polyaniline polymer. Strong acid cation exchange resins are also disclosed as suitable polymer substrates to prepare the conductive polyaniline polymer. Further, it is broadly disclosed that such strong acid cation exchange resins may be used regardless of ion exchange capacity or particle size. However, this reference does not disclose the application of these conductive polyaniline polymers onto metal substrates or the use of the polyaniline polymer formed on strong acid cation exchange resins as a component of a coating.

We have surprisingly found that coatings containing select polyaniline particles, provide corrosion resistance to metal substrates. The select polyaniline particles are prepared in the presence of a core polymer particle containing strong acid groups. Further, the average particle diameter of the polyaniline particles must be within a critical range to allow the application of thin coatings to metal substrates. Coatings with acceptable corrosion resistance may be prepared with the select polyaniline particles at lower levels of polyaniline polymer than coatings prepared with other forms of polyaniline, such as p-toluene sulfonic acid doped polyaniline. As the polyaniline polymer is typically an expensive component of the coating, this allows the coating supplier to prepare lower cost coatings which provide corrosion resistance to metal substrates.

The first aspect of this invention provides a coating composition including a polyaniline particle containing a core polymer particle having strong acid groups and a polyaniline polymer attached to the core polymer particle, wherein the polyaniline particle has an average particle diameter of less than or equal to 10 µm; and a binder.

In the second aspect of this invention, an article is provided including a coating prepared from a coating composition containing a polyaniline particle which contains a core polymer particle having strong acid groups and a polyaniline polymer attached to the core polymer particle; wherein the polyaniline particle has an average particle diameter of less than or equal to 10 µm; and a binder.

The third aspect of this invention provides a polyaniline particle containing a core polymer particle having strong acid groups and a polyaniline polymer attached to the core polymer particle; wherein the polyaniline particle has an average particle diameter of less than or equal to 10 µm.

In the fourth aspect of this invention, a process is provided for preparing a polyaniline particle, including the steps of: preparing a core polymer particle having strong acid groups, wherein the core polymer particle has an average particle diameter of less than or equal to 10 µm; contacting the core polymer particle with at least one aniline monomer selected from aniline and aniline derivatives; allowing the aniline monomer to complex with the core polymer particle; and polymerizing the aniline monomer complexed with the core polymer particle to provide the polyaniline particle; wherein the polyaniline particle has a particle diameter of less than or equal to 10 µm.

As used herein, the term "(meth)acrylate" refers to either acrylate or methacrylate and the term "(meth)acrylic" refers to either acrylic or methacrylic.

The coating composition of this invention includes a polyaniline particle and a binder. The polyaniline particle contains two components: polyaniline polymer which is attached to a core polymer particle. The polyaniline particle has a select size which allows formulation of the polyaniline particle into the coating composition and the preparation of a thin coating. The weight ratio of the core polymer particle to the polyaniline polymer is in the range of 10:1 to 1:2. A coating prepared from the coating composition of this invention provides corrosion resistance to metal substrates.

The polyaniline particle of this invention includes a core polymer particle with a particle diameter in a select range. The core polymer particle is a polymer particle which provides a substrate for polymerizing aniline to form the polyaniline particle. The core polymer particle contains strong acid groups suitable for complexation with aniline monomer. The aniline monomer complexed with the strong acid groups of the core polymer particle is then polymerized to form a polyaniline polymer attached to the core polymer particle. Further, the core polymer particle has a select particle diameter which provides control of the diameter of the polyaniline particle.

The acid groups of the core polymer particle are strong acid groups which allow complexation of the aniline monomer and polymerization to provide polyaniline particles with average particle diameters of less than or equal to 10 µm. The strong acid groups are acid groups with acid dissociation constants represented by $pK_a$ values of less than or equal to 3, preferably less than or equal to 2.5, and more preferably, less than or equal to 2.0. Suitable strong acid groups include sulfonic acid groups, sulfonate groups, and dihydrogen phosphate groups. The polyaniline polymer of this invention may be prepared in the presence of core polymer particles containing levels of strong acid in the range of 1 to 7 milliequivalents acid per gram of dry core polymer particle, preferably in the range of 2 to 6 milliequivalents acid per gram of dry core polymer particle, and more preferably, in the range of 4.5 to 5.5 milliequivalents acid per gram of dry core polymer particle.

The core polymer particle has a diameter of less than or equal to 10 µm, in order to provide a polyaniline particle with a diameter of less than or equal to 10 µm. Preferably, the core polymer particle has a diameter in the range of 10 nm to 5 µm, more preferably in the range of 20 nm to 2 µm, and most preferably in the range of 50 nm to less than 1 µm. As used herein, diameter refers to the average diameter of particles as measured by a light diffraction technique.

The core polymer particle may be prepared by polymerization of at least one ethylenically unsaturated strong acid monomer and at least one second ethylenically unsaturated monomer. Various polymerization methods are known in the art to prepare the core polymer particle and include both aqueous polymerization and non-aqueous polymerization. One polymerization method is emulsion polymerization, which may be used to prepare core polymer particles with average diameters in the range of 10 nm to less than 2 µm, preferably 20 nm to less than 1 µm. Another polymerization method is suspension polymerization, which is suitable for the preparation of the core polymer particles with average diameters of 10 µm or less, preferably average diameters in the range of 1 µm to 10 µm. The core polymer particles may also be prepared by solution polymerization followed by the conversion of the solution polymers to polymer particles.

Ethylenically unsaturated strong acid monomers suitable for preparing the core polymer particles by polymerization include vinyl sulfonic acids; styrenesulfonic acids; vinyl sulfuric acids; allylsulfonic acids; and methallylsulfonic acids. Examples of suitable ethylenically unsaturated strong acid monomers include 2-acrylamido-2-methylpropanesulfonic acid, allylsulfonic acid, allyloxybenzensulfonic acid, 2-hydroxy-3-(2-propenyloxy) propanesulfonic acid, 2-methyl-2-propene-1-sulfonic acid, 3-sulfopropyl (meth)acrylate, styrenesulfonic acid, vinyl sulfonic acid, vinyl sulfuric acid, and the alkali metal and ammonium salts thereof. Mixtures of ethylenically unsaturated strong acid monomers may also be used. Other suitable ethylenically unsaturated strong acid monomers include monomers with strong acid groups include dihydrogen phosphate groups and phosphoric acid groups such as styrene phosphoric acid, vinyl phosphoric acid, styrene phosphonic acid, phosphoethyl (meth)acrylate, and vinyl phosphonic acid.

Second ethylenically unsaturated monomers are monomers which are not ethylenically unsaturated strong acid monomers. The core polymer particle may contain as polymerized units, second ethylenically unsaturated monomers including styrene, α-methyl styrene, and substituted styrenes; vinyl chloride; vinylidene chloride; vinyl esters such as vinyl acetate and vinyl versatate; dienes such as butadiene; ethylene; propylene; acrylonitrile; methacrylonitrile; (meth)acrylates such as $C_1$–$C_{40}$ alkyl esters of (meth)acrylic acid such as methyl (meth)acrylate, ethyl (meth)acrylate, butyl (meth)acrylate, 2-ethyl hexyl (meth)acrylate, octyl (meth)acrylate, lauryl (meth)acrylate, and stearyl (meth)acrylate; hydroxyalkyl esters of (meth)acrylic acid such as hydroxyethyl (meth)acrylate and hydroxypropyl (meth)acrylate; cyclic (meth)acrylates such as cyclohexyl (meth)acrylate and isobornyl (meth)acrylate; and (meth)acrylonitrile. Other suitable second ethylenically unsaturated monomers include at least one multiethylenically unsaturated monomer effective to raise the molecular weight and crosslink the core polymer particle. Examples of multiethylenically unsaturated monomers that may be used include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The core polymer particle may optionally include as polymerized units, low levels of ethylenically unsaturated carboxylic acid monomer. Preferably, the core polymer particle contains an equivalent level of carboxylic acid groups which is 20% or less of the equivalent level of the strong acid groups in the core polymer polymer, more preferably, 10% or less of the equivalent level of the strong acid groups, most preferably, 5% or less of the equivalent level of the strong acid groups. In one embodiment, the core polymer particle does not contain carboxylic acid groups. Suitable ethylenically unsaturated carboxylic acid monomers include (meth)acrylic acid, maleic acid, fumaric acid, itaconic acid, citraconic acid, and alkali metal and ammonium salts thereof.

In one embodiment, the core polymer particle is prepared by a process described in U.S. Pat. No. 4,380,590. In this process, the core polymer particle is prepared by emulsion polymerization of select second ethylenically unsaturated monomers and treating the formed polymer particle with a strong acid, such as sulphuric acid. In this embodiment, the core polymer particle is a crosslinked emulsion copolymer particle with an average particle diameter in the range of 10 nm to 1.5 µm.

The core polymer particle may also be produced by reducing the size of a large size particle, such as a cation exchange resin containing strong acid groups. The cation exchange resin may be a gel type cation exchange resin or a macroreticulated cation exchange resin. Suitable cation exchange resins include a crosslinked styrene polymer having sulfonic acid groups, for example, a polymer prepared from styrene, divinylbenzene, and an ethylenically unsaturated sulfonic acid containing monomer; and macroreticulated cation exchange resins containing strong acid groups. A cation exchange resin containing strong acid groups is typically prepared by suspension polymerization and has a particle diameter in the range of 150 µm to 1.2 mm. Various techniques may be used to reduce the size of the larger sized particles including physical techniques such as grinding in a mill. Suitable mills are attrition mills, fluid-energy mills, colloid mills, vibratory ball mills (vibro-energy mills), pin mills, ball mills, roller mills, horizontal media mills, and autogenous and semiautogenous mills. Likewise, a combination of mills could be used to possibly increase the speed. For example, the first mill reduces the particle diameter to less than 100 µm and the ground product of the first mill is introduced to a second mill which reduces the particle diameter to the desired range.

A preferred method of grinding is to prepare a grind mixture of the large size particles in a solvent or aqueous medium. Suitable organic media include alcohols such as ethanol, isopropanol, and butanol; alkanes such as hexane and heptane; mineral spirits; aromatics such as toluene and xylene; chlorinated solvents such as trichloromethane and carbon tetrachloride; tetrahydrofuran; ketones such as acetone; and mixtures thereof. Dispersants may be added to the grind mixture.

The core polymer particles may be provided in the form of a dispersion in a continuous liquid medium. Suitable liquid mediums include solvents, water, or mixtures thereof. An aqueous dispersion of the core polymer particles is preferred and may have a pH in the range of 1 to 4. Alternatively, the core polymer particles may be provided as a dry material.

The polyaniline polymer is polymerized from an aniline monomer. As used herein, an aniline monomer is selected from aniline or an aniline derivative. An aniline derivative is an aniline molecule which contains at least one substituent group on the aromatic ring. Examples of aniline derivatives include alkyl derivatives of aniline such as o-methylaniline, m-methylaniline, o-ethylaniline, m-ethylaniline, or mixtures thereof. As used herein, the term "polyaniline polymer" refers to polymers containing as polymerized units, one or more aniline monomers. In a preferred embodiment, the polyaniline polymer is polymerized from aniline.

The process to prepare the polyaniline particles includes preparing a reaction mixture by contacting the core polymer particles with the aniline monomer. The aniline monomer, which is basic, forms an acid-base complex or salt with the strong acid groups of the core polymer particle. The time required for the complexation of the aniline monomer with the core polymer particle may vary with, for example, the reaction conditions, the concentrations of the aniline monomer and the core polymer particles, and the availability of the strong acid groups to the aniline monomer. Suitable complexation times to minimize the level of uncomplexed aniline monomer may range from 5 minutes to 24 hours. Preferably at least 90% of the aniline monomer is complexed with the strong acid groups, more preferably at least 95%, and most preferably at least 98%, prior to the initiation of the polymerization of the aniline monomer. The pH of the reaction mixture is preferably at or below 4.0, more preferably below 3.0, to maximize complexation of the aniline monomer with the strong acid groups. Further, it is preferred that the amount of aniline monomer in the reaction mixture, is equal to or less than the amount of strong acid groups on an equivalent basis. Although higher levels of aniline monomer may be used, the amount of aniline monomer complexed to the core polymer particles is limited by the amount of strong acid groups. Excess aniline monomer will remain uncomplexed and may result in the formation of polyaniline polymer which is not attached to the core polymer particle. As particle size of the uncomplexed polyaniline polymer is not controlled by the core polymer particle, this may result in large diameter particles which are unsuitable for use in the coating composition. It is preferred that the reaction mixture contains a ratio of aniline monomer equivalents to strong acid group equivalents in the range of 0.5 to 1, more preferably in the range of 0.7 to 1, and most preferably in the range of 0.9 to 1.

The reaction mixture contains a solvent, water, or a mixture thereof. Suitable solvents include water miscible solvents such as alcohols, ethers, amides, glycols, and mixtures thereof. Preferably the polyaniline particle is prepared in an aqueous reaction mixture.

The complexed aniline monomer may be polymerized in the presence of an initiator or an oxidizing agent, also referred to as an oxidant. The oxidant is chosen to have an oxidation potential which is higher than the oxidation potential of the aniline monomers. Suitable oxidants include, but are not limited to, peroxysulfates, periodates, perchlorates, chromates, dichromates, permanganates, peroxides, and mixtures thereof. Preferably, the oxidant is selected from peroxysulfates, dichromates, and peroxides. More preferred oxidants include ammonium peroxysulfate, potassium dichromate, hydrogen peroxide, and benzoyl peroxide. The most preferred oxidant is ammonium persulfate. Further, the initiator preferably does not generate anions which are capable of forming a salt with the aniline monomer or polyaniline polymer in the presence of the strong acid groups of the core polymer particle. The oxidant may be added to the reaction mixture at a level of 0.8 to 1.5 equivalents based on equivalents of aniline monomer, preferably 0.9 to 1.4 equivalents based on equivalents of aniline monomer.

The polyaniline particles may be prepared at a temperature in the range of $-20°$ C. to $40°$ C. Reaction times may vary to provide sufficient time to remove heat generated by the polymerization of the aniline monomer. Preferably, the polymerization of the aniline monomer is conducted in the absence of oxygen. The solids level of the reaction mixture may be in the range of 1 weight % to 60 weight %.

After completion of the polymerization, the resulting mixture which contains the polyaniline particles may be purified to remove unreacted reagents or reaction byproducts by methods known in the art. Purification may also include the removal of ions by techniques such as deionization or by ultrafiltration. In one embodiment, the polyaniline particles are provided as an aqueous dispersion with a conductivity less than or equal to 200 μmohs, preferably, less than or equal to 100 μmohs, and more preferably, less than or equal to 50 μmohs. Further, the polyaniline particles may be removed from the liquid medium and provided as a dry material.

The polyaniline particles containing the polyaniline polymer and the core polymer particle may have various morphologies such as a core-shell morphology in which the polyaniline polymer forms a shell completely encompassing the core polymer particle. Alternatively, the polyaniline polymer may partially encompass the core polymer particle. In an other embodiment, the core polymer particle is macroreticulated and the polyaniline polymer is contained within the pores or channels of the core polymer particle.

The polyaniline particles may contain on a weight basis from 9% to 67%, by weight, preferably from 15% to 55%, and more preferably, from 20% to 50% polyaniline polymer. The polyaniline particles may contain on a weight basis, from 33% to 91%, preferably from 45% to 85%, and more preferably, from 50% to 80% core polymer particle.

One aspect of the present invention is a coating composition containing the polyaniline particle and a binder. A coating formed from the coating composition of this invention has a polymer matrix containing polyaniline particles in which the polymer matrix is formed from the binder. A key feature of the coating composition is the average particle diameter of the polyaniline particles which allows preparation of thin coatings, useful for providing corrosion resistance to metal substrates. A smooth coating cannot be prepared with particles which have diameters larger than the coating thickness, and preferably has particles which have diameters less than half the coating thickness to ensure the polyaniline particles are contained within the polymer matrix and have minimal contact with the boundaries of the polymer matrix. For a thin coating with a thickness of 25.4 μm (1.0 mil) or thicker, polyaniline particles with average diameters of 10 μm or smaller are preferred.

The binder may be a polymer such as, for example, acrylic (co)polymer, vinyl acetate polymer, vinyl/acrylic copolymer, styrene/acrylic copolymer, polyurethane, polyvinylchloride, styrene/butadiene polymer, and the like, and mixtures thereof. The polymer may be provided in a liquid medium such as a solution polymer, an emulsion polymer, or a suspension polymer, or may be provided as a solid, such as a polymer powder or an extrusion polymer. The polymer may contain reactive groups which upon formation of a film, crosslink to provide a crosslinked coating. Alternatively, the coating composition may contain a crosslinking agent which reacts with complementary reactive groups of the binder.

Conventional crosslinking agents such as, for example, polyaziridine, polyisocyanate, polycarbodiimide, polyepoxide, polyaminoplast, polyalkoxy silane, polyoxazoline, polyamine, and a polyvalent metal compound may be used, providing that the crosslinking agent does not inhibit film formation. Typically, from 0% to 25% of the crosslinking agent may be used, based on the dry weight of the polymer. The amount of crosslinking agent is preferably in the range of 0.05% to 25%, more preferably in the range of 0.1 to 20%, and most preferably in the range of 1% to 10%, based on the dry weight of the polymer.

In one embodiment, the coating composition contains a binder which is an aqueous emulsion polymer. Suitable emulsion polymers include styrene butadiene polymers, styrene acrylate polymers, (meth)acrylate polymers, polyvinyl chloride polymers, ethylene vinyl acetate polymers, and vinyl acetate polymers. The aqueous emulsion polymer which is a binder may have an average particle diameter in the range of 20 nm to 1 µm, preferably in the range of 50 nm to 300 nm, and more preferably in the range of 80 nm to 180 nm. The aqueous emulsion polymer may have a glass transition temperature ($T_g$) in the range of −20° to 60° C., as measured by differential scanning calorimetry using the midpoint in the heat flow versus temperature transition as the $T_g$ value. The coating composition including the aqueous emulsion polymer as a binder may also contain a coalescent to aid in film formation. The level of optional coalescent may be in the range 1% to 20%, based on the weight of the binder solids.

The binder may also be at least one prepolymeric material which is cured to form a polymer. A prepolymeric material is a material which is cured to form a polymer matrix. The coating composition containing the polyaniline particle and at least one prepolymeric material as the binder is applied onto a substrate and then the at least one prepolymeric material is polymerized or is crosslinked to form a polymer matrix. The resulting coating is a polymer matrix which contains the polyaniline particle.

In one embodiment, the prepolymeric material may be an ethylenically unsaturated material such as an ethylenically unsaturated monomer, an ethylenically unsaturated oligomer, or mixtures thereof. The coating is prepared by initiating the polymerization of the ethylenically unsaturated material by exposing the coating composition containing the ethylenically unsaturated material to electromagnetic radiation such ultraviolet or visible radiation, to ionizing radiation such as gamma rays or X-rays, or electron beam irradiation, or by formulating the coating composition with an chemical initiator. Suitable ethylenically unsaturated materials include monoethylenically unsaturated monomers such as $C_1$ to $C_{40}$ alkyl (meth)acrylates, hydroxyalkyl esters of ethylenically unsaturated carboxylic acids, isobornyl (meth)acrylate, styrene and substituted styrenes, carboxylic acid containing ethylenically unsaturated monomers, vinyl chloride, vinylidiene chloride, Other suitable ethylenically unsaturated materials include multiethylenically unsaturated monomers such as trimethylolpropane tri(meth)acrylate, trimethylolpropanepropoxylate tri(meth)acrylate, 1,6-hexanediol di(meth)acrylate, 1,3-butylene glycol di(meth)acrylate, ethoxylated bisphenol A di(meth)acrylates, pentaerythritolglycol di(meth)acrylate, pentaerythritol tri(meth)acrylate, tetraethyleneglycol di(meth)acrylate, melamine (meth)acrylate, diethyleneglycol di(meth)acrylate, neopentylglycol di(meth)acrylate, triethyleneglycol tri(meth)acrylate, Ethylenically unsaturated materials also include ethylenically unsaturated oligomers such as polyether acrylates, epoxy-acrylates, polyester acrylates and polyurethane acrylates, (meth)acrylated acrylic oligomers fluorinated (meth) acrylated acrylic oligomers, polyamine acrylates, and $C_4$–$C_8$ alkane diol (meth)acrylates.

Acrylates are generally preferred over the corresponding methacrylate as acrylates typically have high cure speed. Coating compositions containing an ethylenically unsaturated material as the binder, typically contain a mixture of ethylenically unsaturated monomers or oligomers to provide the desired coating properties.

The coating composition containing ethylenically unsaturated material, which is cure by ultraviolet or visible radiation, preferably includes a photoinitiator in order initiate the polymerization or to accelerate the speed of the polymerization reaction. Useful photoinitiators are well known in the art and include free radical photoinitiators and cationic photoinitiators. Examples of free radical photoinitiators include benzophenone, 2,2-dialkyl-2-hydroxyacetophenone, 2-methylamino-2-benzyl-1-(4-morpholinophenyl)-butan-1one, and acyl phosphines. Examples of cationic photoinitiators include aryldiazonium salts; diarylhalonium salts such as diaryliodonium, diarylbromonium, and diarylchloronium salts with complex metal halide anions; triarylsulfonium salts; nitrobenzyl esters; sulfones; and triaryl phosphates. Cure of the coating composition containing ethylenically unsaturated material using ionizing radiation, in particular, electron beam radiation, does not require a photoinitiator although the coating composition may optionally contain a photoinitiator. The coating composition containing ethylenically unsaturated material may also be cured in the presence of a chemical initiator such as peroxides or azoisobutyronitrile. These chemical initiators generate radicals which initiate the polymerization of the ethylenically unsaturated material. The chemical initiators decompose to form radicals at room temperature although an elevated temperature is often employed to achieve a faster rate of cure.

In one embodiment, the prepolymeric material may be a reactive polymer or oligomer having alkoxysilane and/or acyloxysilane groups. The reactive polymer or oligomer may be formed from alkoxysilane monomer and/or acyloxysilane monomer with other silicon-free monomers. The prepolymeric material containing the alkoxysilane and/or acyloxysilane groups may be crosslinked by a condensation reaction in the presence of moisture and, optionally, a catalyst. Examples of reactive polymers suitable as a prepolymeric material containing alkoxysilane and/or acryloxysilane groups are disclosed in U.S. Pat. No. 4,499,150 and U.S. Pat. No. 4,707,515.

The prepolymeric material useful as a binder may be a two part curing system. The two part curing system includes a first component containing at least two functional groups and a second component containing at least two complementary functional groups which are reactive with the functional groups of the first component. The second component is often referred to as a "curing agent". The polyaniline particle may be dispersed into the first component. Next, the second component is added to the dispersion of the polyaniline particle in the first component to provide the coating composition of this invention. The polyaniline particle may also be dispersed into the second component, followed by the addition of the first component to the dispersion of the polyaniline particle in the second component. Alternatively, the polyaniline particle may be added to a mixture of the first component and the second component provided that the reaction between the functional groups and the complementary functional groups is sufficiently slow to permit dispersion of the polyaniline particle into the mixture and application of the coating composition. Suitable two part curing systems include, for example, epoxy resins with amine, carboxylic acid, anhydride, mercaptan, or hydroxyl containing curing agents; amino resins with hydroxyl, carboxylic acid, or amide containing curing agents; and isocyanate resins with hydroxyl, carboxylic acid, or amine containing curing agents. Isocyanate resins may be aliphatic or aromatic isocyanates. Blocked isocyanates are suitable as the isocyanate resin.

The coating composition containing the two part curing system may also contain a catalyst to accelerate the crosslinking reaction between the functional groups and the complementary functional groups.

In another embodiment, the coating composition is a powder coating. Powder coatings are well known in the art and are discussed in *Organic Coatings: Science and Technology*, Vol. II, Z. W. Wicks, Jr., F. N. Jones, and S. P. Pappas, John Wiley & Sons, Inc., 1994, Chap 31. A binder for a powder coating such as a thermosetting powder coating contains a first component, typically referred to as a primary resin and a second component, typically referred to as a hardener. Suitable binders include epoxy binders which may be crosslinked with dicyandiamide, modified dicyandiamide, or trimellitic anhydride hardeners; polyester binders containing hydroxyl or carboxylic acid groups which may be crosslinked with triglycidyl isocyanurate, tetra(2-hydroxyalkyl)bisamide, blocked aliphatic isocyanates, and tetramethoxymethylglycoluril hardeners; acrylic binders containing epoxy groups which may be crosslinked with dicarboxylic acids; or acrylic binders containing hydroxyl groups which may be crosslinked with blocked isocyanates.

The coating composition may optionally contain a dispersant useful for dispersing the polyaniline particles into the binder or other components of the coating composition. The dispersant may minimize settling of the polyaniline particles or other component particles in the coating composition. The amount of dispersant in the coating composition may range from 0 to 50 weight %, preferably from 1 to 10 weight %, and more preferably, from 2 to 8 weight %, based on the weight of the polyaniline particles. Suitable dispersants for dispersing the polyaniline particles include solutions of acrylic block copolymers with pigment affinity groups, dimerized fatty acids, and polyamine polyesters.

The coating composition may contain, in addition, other components such as, for examples, emulsifiers, curing agents, coalescents, wetting agents, biocides, thickeners, rheology modifiers, plasticizers, anti-foaming agents, colorants, pigments, waxes, or anti-oxidants, and the like.

Corrosion Resistance Test

The corrosion resistance of coatings were evaluated by the corrosion resistance test. Test panels were prepared by applying the coating composition onto a cold rolled steel panel, allowing the coating composition to dry, and then curing the coated panel.

The coated steel test panel was prepared for testing by scribing an "X" pattern on the lower half of the panel. The scribe mark penetrated through the coating to the metal surface. Vinyl tape was applied onto the uncoated surfaces of the panel.

The test panel was placed in a Sheen Salt Spray Cabinet (Sheen, Inc.) and subjected to a constant water spray containing 5 weight % sodium chloride. The test panel was evaluated at various intervals over a period of 120 days.

To evaluate the corrosion resistance of the test panel, the test panel was first removed for the Salt Spray Cabinet and washed with tap water. The surface of the test panel was gently dried. Next, the test panel was immediately evaluated and returned to the Salt Spray Cabinet for further exposure.

Corrosion resistance was characterized by evaluating the top, unscribed half of the test panel for the amount of blistering and the degree of rusting, and the lower half of the test panel for rust along the scribe mark. The corrosion resistance of the top half of the test panel was evaluated according to a rating on a scale of 0 to 10. A rating of 10 indicates an absence of blistering or rust while a rating of 0 indicates that the top half of the test panel is completely covered with blisters or rust. The corrosion resistance of the lower half of the panel was evaluated by the extent of rust forming along the scribe mark according to the following scale by measuring the average width of the rust extending from the scribe mark.

| Rating | Average Width of Rust Along Scribe Mark | |
| --- | --- | --- |
| 10 | 0 inches | 0 mm |
| 9 | 0 < to 1/64 | 0 < to 0.40 mm |
| 8 | 1/64 < to 1/32 | 0.40 < to 0.79 mm |
| 7 | 1/32 < to 1/16 | 0.79 < to 1.6 mm |
| 6 | 1/16 < to 1/8 | 1.6 < to 3.2 mm |
| 5 | 1/8 < to 3/16 | 3.2 < to 4.8 mm |
| 4 | 3/16 < to 1/4 | 4.8 < to 6.4 mm |
| 3 | 1/4 < to 3/8 | 6.4 < to 9.5 mm |
| 2 | 3/8 < to 1/2 | 9.5 < to 12.7 mm |
| 1 | 1/2 < to 5/8 | 12.7 < to 15.9 mm |

A coating which provided an acceptable level of corrosion resistance had ratings of 9 or above for both the top half and bottom half of the panel.

The average diameter of the particles was measured by a light diffraction technique using a Coulter™ LS 130 Particle Sizer (Beckman Coulter, Inc). Particle diameter measurements were conducted on samples containing the polyaniline particle diluted in deionized water to an obscuration range of 45 to 55.

EXAMPLE 1

Preparation of Polyaniline Particle Containing Crosslinked Sulfonic Acid Resin as Core Polymer Particle Core polymer particles were prepared by grinding a 20% solids aqueous slurry of Amberjet™ 1500 cation exchange resin (Amberjet is a trademark of Rohm and Haas Company). Amberjet™ 1500 cation exchange resin is a polymer bead containing sulfonic acid groups and is supplied at an average particle diameter of 0.6–0.7 mm. The slurry was ground for 6 hours on a Vibro-Energy™ Grinding mill (Sweco, Inc.) using 3/4 inch ceramic media. The dispersion containing the core polymer particles had an average particle diameter of approximately 4 μm.

The reaction vessel used to prepare the polyaniline particle was a 1-liter, 4-neck, round bottom, glass flask equipped with a side arm condenser, stirrer, and a thermocouple. To the reaction vessel, 140.0 g of the core polymer particles was added as a 19.8% aqueous dispersion. Next, 85.0 g distilled water (D.I. water) and 0.4 g Triton™ X-405 surfactant (70% active) (Triton is a trademark of Union Carbide Corp.) were added to the reaction vessel. The reaction vessel was flushed with nitrogen gas for one hour. Next, 12.64 g aniline was added with mixing and the contents of the reaction vessel were mixed for 12 hours at room temperature. A constant flow of nitrogen gas was maintained into the reaction vessel.

The polyaniline polymer was polymerized by first cooling the contents of the reaction flask to 3° C. An oxidant solution was prepared by dissolving 38.7 g ammonium persulfate into 90.0 g D.I. water. Next, the oxidant solution was added to the reaction vessel at a constant rate over a period of 3 hours while the contents of the reaction vessel were maintained at less than 5° C. A 5° C. exotherm occurred approximately 40 minutes after the beginning of the 3 hour addition of the oxidant solution. After complete addition of the oxidant solution, the contents of the reaction vessel were maintained at a temperature of 5° C. for 2 hours, before being allowed to warm to room temperature.

The contents of the reaction vessel which contained the polyaniline particles of this invention, were subjected to deionization until the conductivity of the mixture containing the polyaniline particles was less than 10 micromohs as measured by a digital conductivity measure. In the first step of the deionization process, 1 gram of Amberlite™ IRN 77 ion exchange resin was add to the mixture containing the polyaniline particles for each gram of polyaniline particles. The mixture was stirred for 4 hours. Next, the ion exchange resin was removed from the mixture by filtering. In the second step, 1 gram of Amberjet™ 4400 ion exchange resin was added to the mixture for each gram of polyaniline particles. The mixture was then stirred for 4 hours and the ion exchange resin was removed by filtering.

The polyaniline particles were isolated by freezing the deionized mixture containing the polyaniline particles in a dry ice/acetone baths for 5 minutes. Once frozen, the flasks containing the polyaniline particles were placed on a freeze dryer for 48 hours and then placed in a 60° C. vacuum oven for 48 hours to dry the resulting powders and obtain the polyaniline particles of this invention.

The polyaniline particles of Example 1 had an average composition of 68.7% core polymer particle and 31.3% polyaniline polymer, based on weight, and an average particle diameter of 4 µm. The dispersion of Example 1, which was deionized, had a pH of 3 and an emerald green color, which was characteristic of the acid doped emeraldine salt form of polyaniline. A pellet formed from the dispersion of Example 1 had a conductivity of $1.4 \times 10^{-5}$ S/cm as measured by a four point resistivity measurement technique.

EXAMPLE 2

Preparation of Polyaniline Particle Containing Macroreticulated Sulfonic Acid Resin as Core Polymer Particle Core polymer particles were prepared by grinding Amberlyst™ 15 cation exchange resin (Amberlyst is a trademark of Rohm and Haas Co.). Amberlyst™ 15 cation exchange resin is a macroreticulated polymer bead containing approximately 5 milliequivalents per gram of solid resin of sulfonic acid groups and is supplied at an average particle diameter of 1 mm. A 15% solids suspension of the Amberlyst™ 15 cation exchange resin in water was ground for 1 hour in a Turbomil™ mill (Netzsch Co., Exton, Pa.) using 0.8 mm zirconia media (YTZ™ ceramic ball from Tosoh Co., Bound Brook, N.J.) to yield a dispersion containing particles with an average particle diameter of 3 µm. Next, the dispersion was ground for 3 hours in a horizontal media mill (LMZ Zeta™ mill from Netzsch Co., Exton, Pa.) containing 0.5 zirconia media (YTZ™ ceramic ball from Tosoh Co., Bound Brook, N.J.) to yield a dispersion containing the core polymer particles. The core polymer particles had an average particle diameter of 192 nm and were provided as a dispersion at 16.1 weight % solids.

The polyaniline particle was prepared in a reaction vessel with a 1-liter, 4-neck, round bottom, glass flask equipped with a side arm condenser, stirrer, and a thermocouple. To the reaction vessel, 1544.0 g of the core polymer particle dispersion was added. Then the reaction vessel was flushed with nitrogen gas for 1 hour. Next, 1853.0 g D.I. water was added with mixing, followed by the addition of 109.6 g aniline. The contents of the reaction vessel were mixed for 2 hours while maintaining a constant flow of nitrogen gas and cooling to 2° C. An oxidant solution was prepared by dissolving 335.2 g APS in 720 g D.I. water.

The polyaniline polymer was polymerized by adding the oxidant solution to the reaction vessel at a constant rate over a period of 3 hours. An exotherm of 5° C. was observed approximately 35 minutes after beginning the addition of the oxidant solution. After complete addition of the oxidant solution, the contents of the reaction vessel were maintained at a temperature of 5° C. for 1 hour, before being allowed to warm to room temperature.

The contents of the reaction vessel which contained a dispersion of the polyaniline particles, were subjected to deionization, as described in Example 1, until the conductivity of the dispersion was 170 µmohs. The polyaniline particle dispersion was freeze dried by first placing flasks containing the polyaniline particle dispersion in dry ice/acetone baths for 5 minutes. Once frozen, the flasks were placed in a freeze dryer for 48 hours and then placed in a 60° C. vacuum oven for 48 hours to dry the resulting powders to obtain the polyaniline particles of this invention.

The polyaniline particles of Example 2 had an average composition of 69.4% core polymer particle and 30.6% polyaniline polymer, based on weight, and a multimodal particle diameter of in the range of 0.1 µm to 4 µm. The dispersion of Example 2, which was deionized, had an emerald green color and a pH of 3.

EXAMPLE 3

Preparation of Polyaniline Particle Containing Latex Particle as Core Polymer Particle A monomer emulsion was prepared by stirring vigorously under a nitrogen atomsphere 370 g of deoxygenated water, 48.2 g of Triton™ X-200 (trademark of Union Carbide Co.), 348.8 g of styrene, and 51.2 g of commercial grade divinylbenzene (65.8wt % divinylbenzene, balance substantially ethylvinylbenzene). An aqueous initiator solution was prepared by dissolving 2.0 g of potassium persulfate in 100 g of deoxygenated water, and 50 g of the monomer solution was added to the initiator solution. The mixture was stirred to develop a 2.5 cm vortex and was heated to 70° C. under a nitrogen atmosphere. After polymerization began, as evidenced by a sudden decrease in opacity, the remaining monomer emulsion was added over a period of 1.5 hours. The temperature was held at 70° C. for one hour after the addition was completed. The polymer emulsion was cooled to room temperature and filtered through cheesecloth. The measured solids content of the emulsion was 43 weight %.

Next the polymer emulsion was coagulated by a brine coagulation process. First, 1400 ml of a 25 weight % aqueous sodium chloride solution was heated to 100° C. While stirring the sodium chloride solution, 770 ml of the polymer emulsion was added at as rapid a rate as was possible without the solution temperature falling below 95°

C. The solution temperature was held at 100° C. to 103° C. for 30 minutes, and the solid coagulum was filtered out on a 150 μm sieve. The coagulum was rinsed with water and dired overnight at 110° C.

In the next step the coagulated polymer emulsion was sulfonated to prepare a strongly acidic cation exchange material. A 20 g quantity of the dry coagulum was mixed with 120 ml of concentrated sulfuric acid and heated under nitrogen atmosphere with stirring to 120° C.; it was held at this temperature for 5 hours. The reaction mixture was allowed to cool, and water was added as rapidly as possible without allowing the temperature to rise above 95° C. The solid material was allowed to settle, and the supernatant liquid was removed. Approximately 120 ml of water was added to the solid material and then removed. The solid material was transferred to a filter tube, rinsed with water and drained. The resulting dispersion contained sulfonic acid emulsion polymer particles with an average particle diameter of 300 nm and had a polymer solids level of 14.1 weight %. The acid level of the sulfonic acid emulsion polymer was 4.43 milliequivalents per gram of solid polymer.

The polyaniline particle was prepared in a reaction vessel with a 1-liter, 4-neck, round bottom, glass flask equipped with a side arm condenser, stirrer, and a thermocouple. To the reaction vessel, 220.5 g of the sulfonic acid emulsion polymer was added to provide the core polymer particles. Then the reaction vessel was flushed with nitrogen gas for 1 hour. Next, 13.7 g aniline was added with mixing. The contents of the reaction vessel were mixed for 12 hours at room temperature while maintaining a constant flow of nitrogen gas. Next, the contents of the reaction vessel were cooled to 5° C. An oxidant solution was prepared by dissolving 41.9 g APS in 90 g D.I. water.

The polyaniline polymer was polymerized by adding the oxidant solution to the reaction vessel at a constant rate over a period of 3 hours. An exotherm of 3° C. was observed approximately 40 minutes after beginning the addition of the oxidant solution. After complete addition of the oxidant solution, the contents of the reaction vessel were allowed to warm to room temperature and stirred for 21 hours.

The contents of the reaction vessel which contained the polyaniline particles of this invention, were subjected to deionization as described for Example 1, until the conductivity of the mixture containing the polyaniline particles was less than 200 micromohs. Next, the deionized mixture containing the polyaniline particles was freeze dried according to the freeze drying process of Example 1 to obtain the polyaniline particles of this invention.

The polyaniline particles of Example 3 had an average composition of 69.4% core polymer and 30.6% polyaniline polymer, based on weight, and an average particle diameter of 401 nm. The dispersion of Example 3 had an emerald green color and a pH of 0.53.

COMPARATIVE EXAMPLE A

Preparation of Polyaniline Doped with para-Toulene Sulfonic Acid by Conventional Synthesis Polyaniline polymer doped with para-toulene sulfonic acid (pTSA) was prepared in a reaction vessel with a 5-liter, 4-neck, round bottom, glass flask equipped with a side arm, condenser, stirrer, and a thermocouple. The reaction mixture was prepared by first adding 3,343.9 g D.I. water to the reaction vessel and then dissolving 323.3 g pTSA in the water. The reaction vessel was flushed with nitrogen gas for one hour. To the dissolved pTSA, 94.7 g aniline was added to form the anilinium salt of pTSA. Next, the reaction mixture was cooled to 3° C. An aqueous ammonium persulfate (APS) solution was prepared containing 170.4 g APS dissolved in 390.3 g of D.I. water. The reaction was initiated by adding the APS solution to the reaction vessel with good mixing over a period of 3 hours while maintaining the contents of the reaction vessel at 5° C. An exotherm of 5° C. to 10° C. was observed approximately 75 minutes after the beginning of the APS solution addition. After completion of the APS solution addition, the contents of the reaction vessel were maintained at a temperature of 5° C. for 2 hours before warming to room temperature. The resulting mixture, which contained pTSA doped polyaniline particles, had a pH of 0.5.

The contents of the reaction vessel were filtered with filter paper (Whatman 1 filter paper) using a Buchner funnel under slight vacuum. The resulting filter cake was washed 16 times with 600 ml portions of D.I. water to remove water soluble impurities such as the ammonium bisulfate byproduct of the reaction and excess pTSA. The resulting pTSA doped polyaniline particles had an average particle diameter of 60 μm and a pH of 2.5.

A sample of the free base emeraldine form of polyaniline was prepared by adding 20 g of the pTSA doped polyaniline to 1000 ml of 2.8 weight % ammonia water and stirring for at least 12 hours. The sample was filtered and dried.

The pTSA doped polyaniline particles were ground as a 15 weight % aqueous solution in a Vibro-Energy™ Grinding mill (Sweco, Inc.) for 18 hours to reduce the average particle diameter to 4 μm. The pTSA doped polyaniline particles were removed from solution by first freeze drying the solution in a dry ice/acetone bath, placing the frozen solution into a freeze dryer for 48 hours, and then drying the resulting freeze dried cake at 60° C. for an additional 48 hours. The resulting ground pTSA doped polyaniline was an emerald green powder.

The pTSA doped polyaniline particles of Comparative A had an average particle diameter of 60 μm and an average composition of 51.8 weight % polyaniline polymer and 48.2 weight % paratoluene sulfonic acid.

COMPARATIVE EXAMPLE B

Preparation of Polyaniline on Weak Acid Containing Latex Particle

Polyaniline was prepared in the presence of a weak acid containing latex particle.

A monomer emulsion was made from a mixture of 200 g deionized water, 8.13 g of 28% w/w solids ammonium lauryl sulfate, 90.0 g ethyl acrylate (EA), 90.0 g methacrylic acid (MAA), and 7.5 g allyl methacrylate (ALMA) in a bottle. A reaction vessel was then prepared with 150 g deionized water, 34.0 g of the monomer emulsion, and 0.04 g ammonium persulfate dissolved in 1 ml deionized water. The contents of the reaction vessel were heated to 80° C. while being purged with nitrogen. The remainder of the monomer emulsion and 32 g of a solution containing 0.020 g ammonium persulfate in deionized water were fed into the reaction flask at a rate of 4.0 g/min and 0.35 g/min, respectively. At the end of the addition, the temperature of the contents of the reaction vessel were 75° C., and then a solution of 0.10 g t-butyl hydroperoxide in 1 ml of deionized water was added. The reaction was cooled further to 55° C. To this was added a solution of 0.060 g sodium sulfoxylate formaldehyde in 2 ml of deionized water. The reaction mixture was cooled to room temperature and the emulsion was filtered through 100 mesh and 325 mesh sieves. The weak acid containing latex particle contained carboxylic acid groups at a level of 5.92 milliequivalents per gram of dry latex particle. The latex particle has an average particle diameter of 118 nm and a composition of 48 EA/48 MAA/4 ALMA. The weak acid containing latex particle was provided as an aqueous dispersion at 19.8 weight % solids.

The polyaniline was prepared in a reaction vessel with a 1-liter, 4-neck, round bottom, glass flask equipped with a side arm condenser, stirrer, and a thermocouple. To the reaction vessel, 73.5 g D.I. water and 147.0 g of the dispersion containing the weak acid containing latex particle were added. Then the reaction vessel was flushed with nitrogen gas for 1 hour. Next, 13.7 g aniline was added with mixing. The contents of the reaction vessel were mixed for 12 hours at room temperature while maintaining a constant flow of nitrogen gas. Next, the contents of the reaction vessel were cooled to 5° C. An oxidant solution was prepared by dissolving 41.9 g APS in 90 g D.I. water.

The polyaniline was polymerized by adding the oxidant solution to the reaction vessel at a constant rate over a period of 3 hours. An exotherm of 7° C. was observed approximately 100 minutes after beginning the addition of the oxidant solution. After complete addition of the oxidant solution, the contents of the reaction vessel were allowed to warm to room temperature and stirred for 21 hours.

The polyaniline polymer prepared in the presence of a weak acid containing latex particle was deionized, isolated, and purified as described in Example 3.

The polyaniline of Comparative Example B had an average composition of 64.5% core polymer particle and 35.5% polyaniline polymer, based on weight. The dispersion of Comparative Example B had an emerald green color and a pH of 0.74. The dispersion formed sediment on the bottom of the container. The average particle diameter of the polyaniline of Comparative Example B was 12 μm, thus demonstrating that weak acid containing latex particles are unsuitable for preparing the polyaniline particle of the invention.

EXAMPLE 6

Preparation of Coating Compositions Including the Polyaniline Particles and Comparative Coating Compositions Coating compositions including the polyaniline particles of this invention was prepared by combining the epoxy resin, optionally, dispersant, solvent, and the polyaniline particles in a steel shot mill container. The components were first mixed and then steel shot was added to the mill container, filling ⅓ the volume of the mill. The mill container was closed, placed on a shaker, and shaken for 1 hour to disperse the polyaniline particles into the epoxy resin/solvent mixture. The dispersion quality of the coating compositions were evaluated using a Hegman gauge. Coating compositions with a rating of 6 or higher was considered to be adequately dispersed. Next, the dispersion containing the polyaniline particles was separated from the steel shot and mixed with a curing agent to prepare a coating composition including the polyaniline particles.

TABLE 6.1a

Components of Coating Compositions

| Component | Example 6.1 | Example 6.2 | Example 6.3 | Example 6.4 |
|---|---|---|---|---|
| Araldite ™ 6010 epoxy resin | 30.0 g | 30.0 g | 30.0 g | 30.0 g |
| xylene/butanol(4:1 wt./wt.) | 6.0 | 6.0 | 6.0 | 6.0 |
| Disperbyk ™ 162 dispersant (42% active) | 0.7 | 2.1 | 3.5 | 4.9 |
| Example 3 | 6.0 | 6.0 | 6.0 | 6.0 |
| Capcure ™ WR-6 Mercaptan Hardener | 24.0 | 24.0 | 24.0 | 24.0 |
| dispersant based on polyaniline particle | 5 wt. % | 15 wt. % | 25 wt. % | 35 wt. % |
| polyaniline polymer based on coating composition | 3.1 wt. % | 3.1 wt. % | 3.1 wt. % | 3.1 wt. % |

Araldite is trademark of Ciba-Geigy Corporation.
Disperbyk is a trademark of Byk-Chemie Corporation.
Capcure is a trademark of Henkel Corporation.

TABLE 6.1b

Components of Coating Compositions

| Component | Example 6.5 | Example 6.6 | Comparative C |
|---|---|---|---|
| Araldite ™ 6010 epoxy resin | 30.0 g | 30.0 g | 30.0 g |
| xylene/butanol (4:1 wt./wt.) | 6.0 | 6.0 | 7.5 |
| Disperbyk ™ 162 dispersant (42% active) | 0.7 | 0.7 | 4.9 |
| Example 1 | 6.0 | 5.0 | |
| Comparative A | | | 6.0 |
| Capcure ™ WR-6 Mercaptan Hardener | 24.0 | | 24.0 |
| Hardner ™ HY-265 cycloaliphatic amine | | 15.0 | |
| dispersant based on polyaniline particle | 5 wt. % | 5 wt. % | 35 wt. % |
| polyaniline polymer based on coating | 3.1 wt. % | 3.1 wt. % | 5.2 wt. % |

TABLE 6.1b-continued

Components of Coating Compositions

| Component | Example 6.5 | Example 6.6 | Comparative C |
|---|---|---|---|
| composition | | | |

Hardner is a trademark of Ciba Geigy Corporation.

The coating compositions of Examples 6.1 to 6.6 contained 10 weight % polyaniline particles based on solid weight of the coating composition, equivalent to 3.1 weight % polyaniline polymer based on solid weight of the coating composition. In contrast, Comparative C, which also contained 10 weight % pTSA-doped polyaniline polymer, had 5.2 weight % polyaniline polymer.

To prepare the coating composition of Comparative C which contains the pTSA-doped polyaniline, a higher dispersant level was required compared to the Examples 6.1 to 6.6 which contained the polyaniline particle of this invention. A level of 35 weight % dispersant, based on the weight of the pTSA-doped polyaniline, was found to be necessary to provide an uniform dispersion of the pTSA-doped polyaniline in the comparative coating composition with a Hegman rating of 6. Lower levels of dispersant were found to be insufficient to disperse the pTSA-doped polyaniline and were found to yield a coating composition with a Hegman rating of less than 6.

Coated metal samples were prepared by applying a basecoat composition and a topcoat composition onto cold rolled steel panels. The steel panels were 10.2 cm×30.5 cm (4 inches by 12 inches) obtained from Custom Lab Specialties (Sheridan, N.Y.) and were cleaned with acetone prior to the application of the basecoat composition. The basecoat composition was the coating composition of this invention which contained polyaniline particles. The basecoat composition was applied on the steel panel by drawdown with a wire wound rod to form a wet film with a thickness of 51 µm (2 mil) and then allowed to dry at room temperature for 2 hours. Next, the panel with the dried basecoat composition was cured at 85° C. for 1 hour. The topcoat composition was a clear epoxy coating composition formed from the same epoxy resin and hardener as used in the basecoat. The topcoat composition was applied onto the cured basecoat by wire wound rod to form a wet film thickness of 51 µm (2 mils). The topcoat formulation was allowed to dry for 2 hours at room temperature and then cured at 85° C. for 1 hour to provide the coated metal samples.

The coated metal samples were evaluated according to the corrosion resistance test. The top half of the panels coated with the coating compositions of Examples 6.1 to 6.6 and Comparative C did not blister or develop rust, and were assigned ratings of 10. The results for the lower half of the panels are listed in Table 6.2.

TABLE 6.2

Corrosion Resistance as Determined by Evaluation of Scribed Mark on Coated Panel

| Coating Composition | wt. % Polyaniline | 72 hrs. | 240 hrs. | 480 hrs. | 724 hrs. | 1012 hrs. | 1372 hrs. | 1756 hrs. | 2884 hrs. |
|---|---|---|---|---|---|---|---|---|---|
| Example 6.1 | 3.1 | 10 | 10 | 10 | 10 | 10 | 10 | 10 | 10 |
| Example 6.2 | 3.1 | 10 | 10 | 10 | 10 | 10 | 10 | 10 | 10 |
| Example 6.3 | 3.1 | 10 | 10 | 10 | 10 | 10 | 10 | 10 | 9 |
| Example 6.4 | 3.1 | 10 | 10 | 10 | 10 | 10 | 10 | 10 | 10 |
| Example 6.5 | 3.1 | 10 | 10 | 10 | 10 | 10 | 10 | 10 | 10 |
| Example 6.6 | 3.1 | 10 | 10 | 10 | 10 | 10 | 10 | 10 | 10 |
| Comparative C | 5.2 | 10 | 10 | 10 | 10 | 9 | 9 | 9 | 9 |

The results of the corrosion resistance test show that the coating compositions of this invention, as exemplified by Examples 6.1 to 6.6, had acceptable levels of corrosion resistance. Further, the coatings prepared from the compositions of this invention provided acceptable corrosion resistance at a lower level of polyaniline polymer than the coating prepared from Comparative C, which contained pTSA-doped polyaniline.

We claim:

1. A coating composition comprising:
    a) a polyaniline particle comprising:
        i) a core polymer particle in an amount from 33% to 91% by weight of the polyaniline particle comprising strong acid groups derived from the polymerization of one or more ethylenically unsaturated strong acid monomers; and
        ii) a polyaniline polymer attached to said core polymer particle; wherein said polyaniline particle has an average particle diameter of less than or equal to 10 µm; and
    b) a binder.

2. The coating composition according to claim 1 further comprising from 1 weight % to 15 weight % dispersant, based on the weight of said polyaniline particle.

3. The coating composition according to claim 1 comprising from 0.5 weight % to 10 weight % said polyaniline particle, based on the weight of said coating composition.

4. The coating composition according to claim 1 wherein the weight ratio of said core polymer particle to said polyaniline polymer is in the range of 10:1 to 1:2.

5. A polyaniline particle comprising:
    a) a core particle in an amount from 33% to 91% by weight of the polyaniline particle comprising strong acid groups derived from the polymerization of one or more ethylenically unsaturated strong acid monomers; and b) a polyaniline polymer attached to said core polymer particle; wherein said polyaniline particle has an average particle diameter of less than or equal to 10 μm.

6. The polyaniline particle according to claim 5 wherein the weight ratio of said core polymer particle to said polyaniline polymer is in the range of 10:1 to 1:2.

7. The polyaniline particle according to claim 5 wherein the core polymer particle is an emulsion polymer particle.

8. A process for preparing a polyaniline particle, comprising the steps of:
   a) preparing a core polymer particle in an amount of 33% to 91% by weight of the polyaniline particle comprising strong acid groups derived from one or more unsaturated strong acid monomers, wherein said core polymer particle has an average particle diameter of less than or equal to 10 μm;
   b) contacting said core polymer particle with at least one aniline monomer selected from the group consisting of aniline and aniline derivatives;
   c) allowing said aniline monomer to complex with said core polymer particle; and
   d) polymerizing said aniline monomer complexed with said core polymer particle to provide said polyaniline particle; wherein said polyaniline particle has a particle diameter of less than or equal to 10 μm.

9. The process according to claim 8 wherein the weight ratio of said core polymer particle to said polyaniline polymer is in the range of 10:1 to 1:2.

10. An article comprising a coating prepared from a coating composition:
   a) a polyaniline particle comprising:
      i) a core polymer particle in an amount from 33% to 91% by weight of the polyaniline particle comprising strong acid groups derived from the polymerization of one or more ethylenically unsaturated strong acid monomers; and
      ii) a polyaniline polymer attached to said core polymer particle; wherein said polyaniline polymer has an average particle diameter of less than or equal to 10 μm; and
   c) a binder.

* * * * *